(12) United States Patent
Sivabalan et al.

(10) Patent No.: US 9,979,629 B2
(45) Date of Patent: May 22, 2018

(54) DISTRIBUTION OF SEGMENT IDENTIFIERS IN NETWORK FUNCTIONS VIRTUALIZATION AND SOFTWARE DEFINED NETWORK ENVIRONMENTS

(71) Applicant: CISCO TECHNOLOGY, INC., San Jose, CA (US)

(72) Inventors: Muthurajah Sivabalan, Kanata (CA); Sami Boutros, Dublin, CA (US); Peter Psenak, Bratislava (SK); Rex Emmanuel Fernando, Dublin, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 14/832,888

(22) Filed: Aug. 21, 2015

(65) Prior Publication Data

US 2017/0054626 A1    Feb. 23, 2017

(51) Int. Cl.
*H04L 12/46*    (2006.01)
*H04L 12/751*    (2013.01)
*H04L 12/755*    (2013.01)
*H04L 12/707*    (2013.01)
*H04L 12/715*    (2013.01)

(52) U.S. Cl.
CPC ........ *H04L 45/021* (2013.01); *H04L 12/4662* (2013.01); *H04L 45/22* (2013.01); *H04L 45/64* (2013.01)

(58) Field of Classification Search
None
See application file for complete search history.

(56) References Cited

U.S. PATENT DOCUMENTS

| | | |
|---|---|---|
| 6,381,646 B2 | 4/2002 | Zhang |
| 6,778,524 B1 | 8/2004 | Augart |
| 7,043,564 B1 | 5/2006 | Cook |
| 7,496,105 B2 | 2/2009 | Vasseur |
| 7,543,052 B1 | 6/2009 | Cesa Klein |
| 7,672,236 B1 | 3/2010 | Karunakaran |
| 7,738,469 B1 | 6/2010 | Shekokar et al. |
| 7,784,055 B2 | 8/2010 | Srivastava |

(Continued)

FOREIGN PATENT DOCUMENTS

WO    WO2016/007274    1/2016

OTHER PUBLICATIONS

Technical Report, Carrier Software Defined Networking (SDNa), Fujitsu, 140 pages, Mar. 2014.

(Continued)

*Primary Examiner* — Duc T Duong

(57) ABSTRACT

A method and system are disclosed for distributing (advertising) segment identifiers in network functions virtualization and/or software defined networking environments. An exemplary method includes receiving a route advertisement that includes a prefix with a forwarding address for a first network element and receiving a segment identifier (SID) advertisement that includes a prefix SID for the prefix. The route advertisement may be received from a second network element proxying control plane functions for the first network element. Reachability information for the first network element is updated based on the route advertisement and the SID advertisement.

20 Claims, 3 Drawing Sheets

(56) References Cited

U.S. PATENT DOCUMENTS

| | | |
|---|---|---|
| 8,767,757 B1 | 7/2014 | Chudgar |
| 8,804,736 B1 | 8/2014 | Drake |
| 8,942,235 B1 | 1/2015 | Vinapamula |
| 9,455,908 B2 | 9/2016 | Fernando et al. |
| 9,503,363 B2 | 11/2016 | Sivabalan et al. |
| 9,660,897 B1* | 5/2017 | Gredler .................. H04L 45/04 |
| 2001/0051865 A1 | 12/2001 | Kerr et al. |
| 2003/0236913 A1 | 12/2003 | Hoban |
| 2006/0153225 A1 | 7/2006 | Kamiay |
| 2006/0187912 A1 | 8/2006 | Schwartz |
| 2007/0058638 A1* | 3/2007 | Guichard ............ H04L 12/4641 370/395.31 |
| 2007/0162968 A1 | 7/2007 | Ferreira |
| 2007/0248065 A1 | 10/2007 | Banerjea et al. |
| 2010/0150005 A1 | 6/2010 | Gerber |
| 2010/0284403 A1 | 11/2010 | Scudder |
| 2011/0080830 A1 | 4/2011 | Ko |
| 2011/0110373 A1 | 5/2011 | Ghosh |
| 2011/0131308 A1 | 6/2011 | Eriksson |
| 2012/0069740 A1 | 3/2012 | Lu |
| 2012/0207175 A1 | 8/2012 | Raman |
| 2013/0155902 A1 | 6/2013 | Feng |
| 2013/0191552 A1 | 7/2013 | Patterson |
| 2013/0272305 A1 | 10/2013 | Lefebvre et al. |
| 2013/0290622 A1 | 10/2013 | Dey |
| 2013/0297798 A1 | 11/2013 | Arisoylu et al. |
| 2014/0098675 A1 | 4/2014 | Frost et al. |
| 2014/0169370 A1* | 6/2014 | Filsfils .................. H04L 69/166 370/392 |
| 2014/0215560 A1 | 7/2014 | Roberson |
| 2014/0269266 A1 | 9/2014 | Filsfils et al. |
| 2014/0269421 A1 | 9/2014 | Previdi et al. |
| 2014/0269698 A1 | 9/2014 | Filsfils et al. |
| 2014/0269721 A1 | 9/2014 | Bashandy et al. |
| 2014/0317259 A1 | 10/2014 | Previdi et al. |
| 2014/0341222 A1* | 11/2014 | Filsfils ................. H04L 45/507 370/395.5 |
| 2015/0052575 A1 | 2/2015 | Myla |
| 2015/0103844 A1 | 4/2015 | Zhao |
| 2015/0109904 A1* | 4/2015 | Filsfils .................... H04L 45/22 370/221 |
| 2015/0245392 A1* | 8/2015 | Chan .................. H04W 76/022 370/331 |
| 2015/0304206 A1* | 10/2015 | Filsfils .................... H04L 45/04 709/238 |
| 2015/0319078 A1 | 11/2015 | Lee |
| 2015/0326675 A1* | 11/2015 | Kini ........................ H04L 67/16 709/224 |
| 2016/0006654 A1 | 1/2016 | Fernando |
| 2016/0254991 A1* | 9/2016 | Eckert ................. H04L 12/4633 370/225 |
| 2016/0366051 A1* | 12/2016 | Chen ...................... H04L 45/50 |
| 2017/0048138 A1 | 2/2017 | Sivabalan |

OTHER PUBLICATIONS

S. Sivabalan, et al., "PCE-Initiated Traffic Engineering Path Setup in Segment Routed Networks", Network Working Group, Internet-Draft, Jun. 17, 2013, 16 pages; https://tools.ietf.org/html/draft-sivabalan-pce-segment-routing-00.

S. Sivabalan, et al., "PCEP Extensions for Segment Routing", Network Working Group, Internet-Draft, Jul. 12, 2013, 20 pages; https://tools.ietf.org/html/draft-sivabalan-pce-segment-routing-01.

"OpenFlow Switch Specification," Feb. 28, 2011, XP055132070, Sections 2, 4.1.1 http://archive.openflow.org/documents/openflow-spec-v1.1.0.pdf.

Fernando, R., et al., "Virtual Topologies for Service Chaining in BGP/IP MPLS VPNs," Internet Draft draft-rfernando-advpn-service-chaining-04, Jul. 4, 2014; 18 pages.

Bitar, N., et al., "Interface to the Routing System I2RS) for Service Chaining: Use Cases and Requirements," Internet Engineering Task Force Internet Draft draft-bitar-i2rs-service-chaining-01, Feb. 14, 2014; 15 pages.

\* cited by examiner

DISTRIBUTION OF SEGMENT IDENTIFIERS IN NETWORK FUNCTIONS VIRTUALIZATION AND SOFTWARE DEFINED NETWORK ENVIRONMENTS

TECHNICAL FIELD

This disclosure relates in general to the field of communications and, more particularly, to distributing (advertising) segment identifiers in network functions virtualization and/or software defined networking environments.

BACKGROUND

Network Functions Virtualization (NFV) technology, in combination with Software Defined Networking (SDN), is transforming today's networks, including how networks are deployed and managed along with how services are delivered by such networks. NFV and/or SDN networking environments enable service providers to reduce costs, increase business agility, and accelerate time to market of new services. As these environments trend towards implementing segment routing, challenges arise related to distributing network topology information and data within the network.

DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

A method and system are disclosed for distributing (advertising) segment identifiers in a network environment, particularly network functions virtualization and/or software defined networking environments. An exemplary method includes receiving a route advertisement that includes a prefix with a forwarding address for a first network element and receiving a segment identifier (SID) advertisement that includes a prefix SID for the prefix. The route advertisement may be received from a second network element proxying control plane functions for the first network element. Reachability information for the first network element is updated based on the route advertisement and the SID advertisement.

The route advertisement and the SID advertisement may be IGP advertisements. In some embodiments, the forwarding address is equal to the prefix.

The method may further include designating the forwarding address as a next hop for the prefix SID. In some embodiments, the SID advertisement includes a forwarding flag that indicates whether the prefix has been assigned a forwarding address, and the method further includes designating the forwarding address as the next hop for the prefix SID when the forwarding flag is set. The method may include determining that the second network element is on a same network as the first network element. The method may further include calculating a next hop for the prefix SID. In some embodiments, the method may include determining that no neighboring network element has an address equal to the calculated next hop and/or determining that the forwarding address matches the calculated next hop.

Example Embodiments

Figure 1:
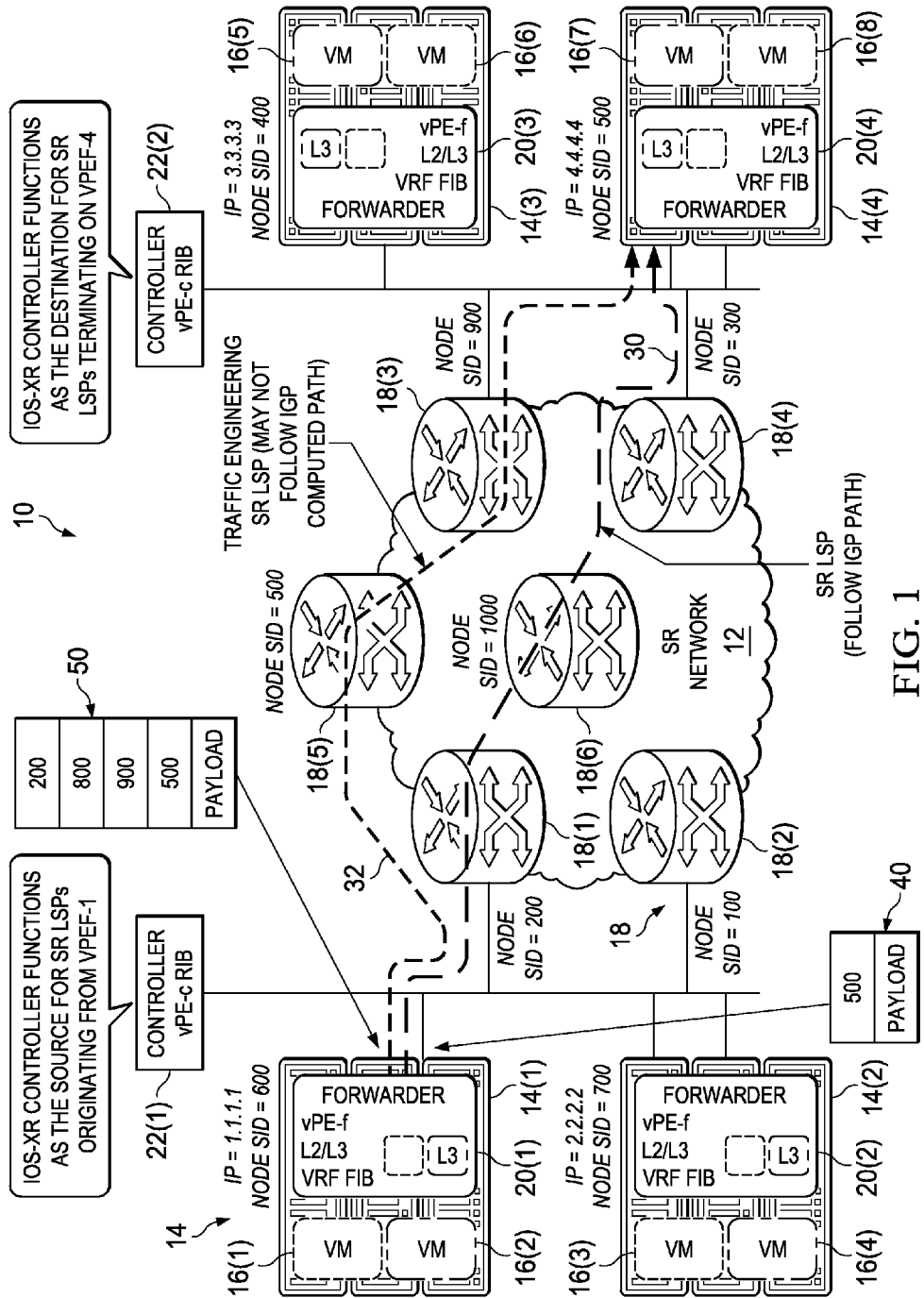
FIG. 1 a simplified schematic block diagram illustrating a communication system that implements segment routing in a network environment, particularly a network functions virtualization (NFV) and/or software defined networking (SDN) environment.

FIG. 1 a simplified schematic block diagram illustrating a communication system 10 that implements segment routing in a network environment, particularly a network functions virtualization (NFV) and/or software defined networking (SDN) environment. Communication system 10 includes a segment routing (SR) network 12 that interconnects and facilitates communication among various network elements, such as hosts 14(1), 14(2), 14(3), and 14(4) (generally referred to as hosts 14). Hosts 14 can communicate (for example, by receiving/forwarding packets) with each other over SR network 12, and hosts 14 can communicate (for example, by receiving/forwarding packets) with external hosts connected to SR network 12 over an external network. Hosts 14 can provide various information technology services, including web services, database services, data processing services, directory services, and/or other services to network elements associated with communication system 10. In FIG. 1, hosts 14 represent physical network elements, such as servers, that can host virtual machines (virtual hosts), such as virtual machines 16(1), 16(2), 16(3), 16(4), 16(5), 16(6), 16(7), and 16(8) (generally referred to as virtual machines 16). Virtual machines 16 can share resources without interfering with each other, enabling multiple operating systems and/or multiple applications to execute concurrently on any one host 14. As used herein, the term "host" may include any network element, physical (for example, servers) or virtual (for example, virtual machines), connected to other network elements over a network. As used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

SR network 12 may be realized by various SR-enabled network nodes (in other words, any network node employing segment routing), referred to as SR nodes herein. Commonly-employed packet routing mechanisms include Internet Protocol (IP) and/or Multiprotocol Label Switching (MPLS), where IP routing uses IP addresses inside packet headers to make packet forwarding decisions and MPLS uses short path identifiers, called labels, attached to packets to make packet forwarding decisions. MPLS forwards packets along label-switched paths (LSPs) based on the labels using a suitable control plane signaling protocol, such as label distribution protocol (LDP) and/or resource reservation protocol—traffic engineering (RSVP-TE) protocol. In contrast, SR nodes are configured with a segment routing packet forwarding mechanism, in which packet forwarding decisions are based on short path identifiers, called segment identifiers (SIDs), attached to packets. In particular, SR nodes make packet forwarding decisions based on SIDs as opposed to labels, such that SR nodes can set up MPLS-like LSPs (referred to as SR LSPs) without employing LDP and/or RSVP-TE signaling protocols in their control planes. SR network 12 can thus provide simpler network operation and better scalability, which has proven beneficial to NFV and/or SDN environments.

In SR network 12, a path followed by a packet may be encoded in the packet itself, similar to source routing. SR nodes can select any path to forward traffic, whether it is an explicit path (for example, expressed in a packet) or a dynamic path (for example, following a shortest path determined by a control plane routing protocol). The path is encoded as a list of segments (sub-paths) that may be combined to form a complete route to a network destination. Each segment has a segment identifier (SID) that is distributed throughout SR network 12. Further, each SR node and each link (adjacency) has an associated SID, respectively referred to as a Node SID and an Adjacency SID. A Node SID is globally unique, identifying a particular SR node and representing a shortest path to the particular SR node as determined by control plane routing protocols. On the other hand, an Adjacency SID is locally significant, identifying and representing a specific adjacency (such as egress interface) to a neighboring SR node. In various implementations, a network administrator can allocate Node SIDs to SR nodes from a reserved block, while SR nodes can automatically generate Adjacency SIDs outside the reserved block of Node SIDs.

SR nodes can exchange network topology information in communication system 10 using any suitable control plane routing protocol, such as interior gateway protocol (IGP). In various embodiments, SR nodes implement a type of IGP referred to as a link-state routing protocol, such as intermediate system to intermediate system (IS-IS) protocol and/or open shortest path first (OSPF) protocol, where each SR node can originate information about itself, its directly connected links, and a state of those links. This information is passed among SR nodes using IGP advertisements (messages), such that each SR node can have similar information about SR network 12 and/or communication system 10. Each SR node can use this information to independently calculate its own best paths from itself to possible destinations in SR network 12 and/or communication system 10. SR nodes can then form associated routing structures based on a collection of best paths. Though SR network 12 is similar to a MPLS network in that packets traverse SR network 12 along a LSP (in other words, via SR LSPs) and both involve network nodes that implement IGP to exchange network topology information, SR nodes can distribute (advertise) SIDs using IGP. For example, SR nodes send SIDs within IGP advertisements, instead of within LDP label advertisements, eliminating a need for a separate protocol for exchanging identifiers such as LDP or RSVP-TE.

Though an SR node's control plane differs significantly from a control plane of IP and/or MPLS-enabled network nodes, the SR node's data plane is similar in many respects to data planes of IP and/or MPLS-enabled network nodes. SR is data plane agnostic. Accordingly, SR may be realized using an IP data plane (such as an IP version 6 (IPv6) data plane), a MPLS data plane, or other forwarding plane. When used with a MPLS data plane, SIDs may be formatted (encoded) as MPLS labels, included in an MPLS label stack entry. SIDs may also be included in LDP forwarding tables to avoid altering the MPLS data plane. When used with an IPv6 data plane, SIDs may be included in an optional extension header provided for in IPv6 specifications. Note that, unless otherwise indicated, any of the SR techniques described herein may be realized using MPLS, IPv6, or any other data plane.

In NFV and/or SDN network environments, SR network 12 includes SR nodes having collocated (integrated) control plane and data plane functions, and SR nodes having dislocated control plane and data plane functions. A SR-enabled network node configured to make forwarding decisions without instructions from an external entity may be referred to as an SR node having a collocated control/data plane, which may reside on a same physical network element. A SR-enabled network node configured to make forwarding decisions based on instructions received from an external entity, such as a centralized control plane, may be referred to as an SR node with a dislocated control/data plane, which may reside on different physical network elements. Unique challenges arise when establishing SR between SR nodes having collocated control/data planes and SR nodes having dislocated control/data planes. As described below, segment routing techniques are described herein for distributing (advertising) SIDs associated with SR nodes having dislocated control/data planes.

In FIG. 1, SR network 12 includes SR-enabled routers 18(1), 18(2), 18(3), 18(4), 18(5), and 18(6) (generally referred to as SR routers 18) and SR-enabled virtual provider edge routers (generally referred to as SR virtual provider edge routers) that interconnect hosts 14, virtual machines 16, and/or other network elements of communication system 10. SR routers 18 have collocated control/data planes, whereas SR virtual provider edge routers have dislocated control/data planes, according to NFV and/or SDN networking topologies. In some embodiments, each SR-enabled router 18 has a control plane and a data plane integrated thereon, for example, residing on a same network element. In some embodiments, each SR virtual provider edge router includes a control plane physically decoupled from a data plane, for example, residing on different network elements. SR routers 18 and SR virtual provider edge routers include a forwarding (data plane) element/engine and a routing (control plane) element engine. For virtual provider edge routers, described further below, the forwarding (data plane) element/engine is referred to as a virtualized provider edge forwarder (vPE-F) and the routing (control plane) element/engine is referred to as a virtualized provider edge control plane (vPE-C). Virtually any number of routers may be used in SR network 12 depending on network topology considerations for communication system 10. As used herein, the term "router" includes any network element configured to receive packets from a source and forward packets appropriately to a destination in a network or a destination out of network.

Control plane and vPE control plane determine how to route data (for example, a next hop for the data and/or an outgoing port/interface for the data), and data plane and vPE forwarder forward the data according to routes specified respectively by control plane and vPE control plane. Control plane and vPE control plane typically use routing protocols for communicating with other network elements to generate and update network topology information, and to select routes or paths to destinations (for example, based on advertised routes from neighboring network elements). Routing protocols can include Border Gateway Protocol (BGP), IGP, LDP, RSVP, other suitable protocol, or combination thereof. Control plane and vPE control plane can populate routes into routing structures, such as a Routing Information Base (RIB) table, a Label Information Base (LIB) table, other suitable routing structure, or combination thereof. Control plane and vPE control plane respectively provide data plane and vPE forwarder with information, such as route and/or adjacency information, based on the routing structures. For example, control plane and vPE control plane can populate forwarding structures (for example, a Label Forwarding Information Base (LFIB) table, a Forwarding Information Base (FIB) table, other suitable forwarding structure, or combination thereof) associated with respective data plane or vPE forwarder with routing and/or adjacency information. Data plane and vPE forwarder can use the forwarding structures to determine how to forward data in communication system 10 (for example, by accessing a forwarding table that relates a packet identifier, such as SID, to a specific network interface where the data should be sent to reach its destination).

In FIG. 1, a vPE forwarder instantiated on each host 14 can provide network connectivity for virtual machines 16 running thereon. For example, a vPE forwarder 20(1) is instantiated on host 14(1), a vPE forwarder 20(2) is instantiated on host 14(2), a vPE forwarder 20(3) is instantiated on host 14(3), and a vPE forwarder 20(4) is instantiated on host 14(4). vPE forwarders 20(1)-20(4) may be co-resident with virtual machines 16 instantiated on respective hosts 14. As described herein, each vPE forwarder 20(1)-20(4) is configured for performing only data plane (forwarding) functions, while associated control plane functions are implemented via proxy. Further, for purposes of the present disclosure, though vPE forwarders 20(1)-20(4) do not support control plane routing protocols (such as IGP), vPE forwarders 20(1)-20(4) may be configured with control plane support that facilitates programming forwarding state and IP forwarding and/or MPLS forwarding operations (such as label push, pop, and swap). In various implementations, virtual machines 16 may attach to respective vPE forwarders 20(1)-20(4) as a first hop network switch/router. In some embodiments, vPE forwarders 20(1)-20(4) may be substantially identical instances realized (and executed) respectively on hosts 14(1)-14(4). In some embodiments, vPE forwarders 20(1)-20(4) may be separate and distinct instances realized (and executed) respectively on hosts 14(1)-14(4). Note that, in some implementations, an instance refers to a specific realization of a software object.

vPE control planes are provided for proxying control plane functions for vPE forwarders 20(1)-20(4). In FIG. 1, a controller 22(1) provides a vPE control plane for vPE forwarder 20(1) and vPE forwarder 20(2), and a controller 22(2) provides a vPE control plane for vPE forwarder 20(3) and vPE forwarder 20(4). Controller 22(1) thus proxies control plane functions for (in other words, "handles," "is responsible for," and/or "is associated with") vPE forwarder 20(1) and vPE forwarder 20(2). Similarly, controller 22(2) proxies control plane functions for vPE forwarder 20(3) and vPE forwarder 20(4). In some embodiments, controller 22(1) and controller 22(2) may implement an operating system, such as IOS (Internetwork Operating System) XR operating system from Cisco Systems, Inc., such that controllers 22(1) and 22(2) may be referred to as IOS-XR controllers. Controllers 22(1) and 22(2) may provide necessary control plane functions for any network elements in communication system 10 that lack full control plane functions, such as vPE forwarders 20(1)-20(4).

Communication system 10 can include a network topology configured to include any number of servers, virtual machines, switches, routers, and other network nodes interconnected to form SR network 12. Network elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today, NFV and/or SDN network environments are trending towards implementing segment routing, where segment routed LSPs ("SR LSPs") are becoming a preferred data transport method. In such environments, SR LSPs may be established to network elements having dislocated control/data planes. For example, in communication system 10, each controller (where vPE control planes reside) can function as a source and/or destination for SR LSPs originating and/or terminating on vPE forwarders for which the controller is responsible. In other words, each controller acts as a source/destination for a SR LSP in a control plane, while the SR LSP originates/terminates on a vPE forwarder associated with the controller in a data plane. In FIG. 1, controller 22(1) functions as a source/destination for SR LSPs originating/ terminating on vPE forwarders 20(1) and 20(2), and controller 22(2) functions as a source/destination for SR LSPs originating/terminating on vPE forwarders 20(3) and 20(4). In a data plane, an IGP-computed SR LSP 30 and a non-IGP-computed SR LSP 32 (such as an SR LSP that uses a traffic engineered path (SR-TE LSP)) are depicted that originate at vPE forwarder 20(1) and terminate at vPE forwarder 20(4). Following IGP-computed SR LSP 30, a packet traverses SR network 12 from vPE forwarder 20(1) to vPE forwarder 20(4) via SR-enabled router 18(1), SR-enabled router 18(6), and SR-enabled router 18(4). Following non-IGP-computed SR LSP 32, data traverses SR network 12 from vPE forwarder 20(1) to vPE forwarder 20(4) via SR-enabled router 18(1), SR-enabled router 18(5), and SR-enabled router 18(3). In a control plane, controller 22(1) serves as a source for both IGP-computed SR LSP 30 and non-IGP-computed SR LSP 32, while controller 22(2) serves as a destination for both IGP-computed SR LSP 30 and non-IGP-computed SR LSP 32.

Control plane functions necessary to set up and maintain IGP-computed SR LSP 30 and non-IGP-computed SR LSP 32 reside in controller 22(1) and controller 22(2), which respectively manage vPE forwarder 20(1) and vPE forwarder 20(4). According to SR, vPE forwarders 20(1)-20(4) may be assigned a Node SID, which can be advertised by IGP (such as ISIS or OSPF) so that other SR nodes can establish SR LSPs to vPE forwarders 20(1)-20(4). For example, in FIG. 1, vPE forwarder 20(1) is assigned a Node SID of 600, vPE forwarder 20(2) is assigned a Node SID of 700, vPE forwarder 20(2) is assigned a Node SID of 600, vPE forwarder 20(3) is assigned a Node SID of 400, and vPE forwarder 20(4) is assigned a Node SID of 500. A network administrator/operator or associated controller, controller 22(1) or controller 22(2), can assign (allocate) Node SIDs to vPE forwarders 20(1)-20(4). SR routers 18 may also be assigned Node SIDs, for example, by a network administrator/operator. In FIG. 1, SR-enabled router 18(1) is assigned a Node SID of 200, SR-enabled router 18(2) is assigned a Node SID of 100, SR-enabled router 18(3) is assigned a Node SID of 900, SR-enabled router 18(4) is assigned a Node SID of 300, SR-enabled router 18(5) is assigned a Node SID of 800, and SR-enabled router 18(6) is assigned a Node SID of 1000.

In the data plane, IGP-computed SR LSP 30 and non-IGP-computed SR LSP 32 are represented by a segment list (stack) that includes an ordered list of SIDs defining a route for data originating at vPE forwarder 18(1) and terminating at vPE forwarder 18(4). For example, in a MPLS data plane, IGP-computed SR LSP 30 may be defined by a label stack 40 that includes Node SID 500. A payload (data or packet) routed using label stack 40 will traverse SR network 12 from vPE forwarder 18(1) along a shortest path to vPE forwarder 18(4). Similarly, non-IGP-computed SR LSP 32 may be defined by a label stack 50 that includes Node SID 200, Node SID 800, Node SID 900, Node SID 500. A payload (data or packet) routed using label stack 50 will traverse SR network 12 from vPE forwarder 18(1) along an explicit path to vPE forwarder 18(4), through SR-enabled router 18(1), SR-enabled router 18(5), and SR-enabled router 18(3). In various embodiments, controller 22(1) can install an MPLS label forwarding entry for Node SID 500 (in other words, vPE forwarder 18(4)) on vPE forwarder 18(1), such as an egress label set for IGP-computed SR LSP 30 as {500} and/or an egress label set path for non-IGP-computed SR LSP 32 as {200 (top), 800, 900, 500}.

Establishing SR LSPs to network elements having dislocated control/data planes, such as SR virtual provider edge routers (which include one of vPE forwarders 20(1)-20(4) and its associated controller 22(1) or controller 22(2)), presents unique challenges. For example, SR nodes having collocated control/data planes (such as SR routers 18) need to forward data to a data plane (such as vPE forwarders 20(1)-20(4)) of a SR node having a dislocated control/data plane, while learning network topology information associated with the data plane from a control plane (controller 22(1) or controller 22(2)) of the SR nodes having the dislocated control/data plane. Since vPE forwarders 20(1)-20(4) do not support control plane functions, vPE forwarders 20(1)-20(4) cannot provide reachability information to SR routers 18 and/or other network elements of SR network 12. Instead, SID allocation and distribution (advertisement) needs to be executed outside vPE forwarders 20(1)-20(4), and any network topology information associated with vPE forwarders 20(1)-20(4) needs to be communicated to SR routers 18 by controller 22(1) and controller 22(2) responsible for control plane functions of vPE forwarders 20(1)-20(4). Further, SR routers 18 should forward data traffic (packets) via SR LSPs directly to vPE forwarders 20(1)-20(4), without forwarding the data traffic to controller 22(1) or controller 22(2) proxying control plane functions for vPE forwarders 20(1)-20(4).

Communication system 10 is configured to address the issues described above (and others) in offering a system and method for distributing (advertising) SIDs in a network environment, particularly NFV and/or SDN environments. Embodiments of communication system 10 provide for a SR routing mechanism that seamlessly distributes SIDs between SR domains with SR nodes having dislocated control/data planes and SR domains with SR nodes having collocated control/data planes. In various implementations, for SR nodes having dislocated control/data planes, a control plane element/engine can advertise reachability information for data plane elements/engines for which it proxies control plane functions, while not attracting data traffic destined for such data plane elements/engines. Further, SR nodes having collocated control/data planes can communicate seamlessly with the control plane element/engine to discover reachability information for the data plane element/engine, and then seamlessly forward data traffic via SR directly to the data plane element/engine. Different embodiments may have different advantages than described herein, and no particular advantage is necessarily required of any of the embodiments described herein.

For network elements having dislocated control/data planes, a control plane engine advertises a route for each data plane engine for which it proxies control plane functions, thereby attracting data traffic that needs forwarding to its associated data plane engines. The route may be defined by an address prefix and its associated path attributes. A path attribute is generally any property or characteristic that may be associated with the prefix, for example, a cost metric, bandwidth constraint, next hop identifier, and so forth. According to SR techniques provided for in the present disclosure, the route includes a network mask (for example, /32 or /128), an address prefix, such as a particular IP address, and a forwarding address associated with the prefix. The forwarding address identifies a destination (here, a data plane engine) for routing data other than a source (here, the control plane engine) that originated the route advertisement. The route may be advertised using IGP advertisements. In network topologies that implement OSPF routing protocol in the control plane, the route advertisement may be a link-state advertisement (LSA) that supports advertising a forwarding address for a prefix. In some embodiments, the route advertisement is an external LSA, such as a LSA Type-5 or a LSA Type-7. In some embodiments, OSPF LSAs may be extended to include a forwarding address with an intra-area prefix and/or inter-area prefix specified in the LSA. In network topologies that implement ISIS routing protocol, ISIS route advertisements may be extended to include a forwarding address for a prefix.

With SR, a sub-class of segments, which include prefix segments and adjacency segments, can identify a forwarding instruction. Prefix segments steer packets along a shortest path to a destination (for example, by using all available Equal Cost Multi-Path (ECMP) paths), and adjacency segments steer packets onto a specific link to a neighboring SR node. A prefix SID, which can translate to a local MPLS label, identifies a segment route leading to a destination represented by a prefix. In the present disclosure, for network elements having dislocated control/data planes, the control plane engine also advertises a prefix SID for any prefix associated with a data plane engine for which it proxies control plane functions. The prefix SIDs may be advertised using IGP advertisements. Each prefix SID may identify a shortest path to its respective prefix, which is associated with a particular data plane engine controlled by the control plane engine. The control plane engine and/or network administrator/operator may allocate (provision) prefix SIDs for the data plane engines.

A SID advertisement, such as that used by the control plane engine to advertise prefix SIDs, can support a set of attributes that may be used to discover network elements. These attributes contain type, length, and value descriptions, often referred to as TLVs. SR-enabled network elements can use TLVs to receive and send information to their neighbors. Details such as configuration information, device capabilities, and device identity can thus be advertised using SR. For example, SR includes a prefix SID sub-TLV that carries a network element's prefix SID (here, a prefix SID identifying a route to a prefix associated with a data plane engine/element). The prefix SID sub-TLV can include various flags for conveying further information associated with the prefix identified by the prefix SID. The various flags can include, but are not limited to, a node SID flag (n-flag), a non-PHP flag (p-flag), an explicit null flag (e-flag), a value flag (v-flag), a local flag (l-flag), and/or other suitable flag. The present disclosure proposes a forwarding flag (f-flag) for the prefix SID sub-TLV, which can be used to indicate whether a forwarding address has been assigned to the prefix-SID. In some embodiments, the forwarding flag is realized by one or more bits (referred to as an f-bit) provisioned in a flag field of a prefix SID sub-TLV. When the f-bit is set (for example, by the control plane engine), a network element receiving the SID advertisement knows that a forwarding address has been assigned to the prefix identified by the prefix SID and/or that the network element receiving the SID advertisement has received a route advertisement associating the prefix with the forwarding address. Accordingly, when the f-bit is set in the SID advertisement, the network element knows to forward data traffic to the forwarding address (and thus, when related to SR nodes having dislocated control/data planes, the network element knows to forward data traffic directly to the data plane engine).

Upon receiving route advertisements and SID advertisements containing the information described above, SR-enabled network nodes can update reachability information for the data plane engine, such as updating a data plane to ensure that data traffic is forwarded to the data plane engine (using the forwarding address) instead of to the control plane engine, a source of the route advertisement. SR-enabled network nodes can thus program forwarding and/or routing tables based on information received from the control plane engine since the data plane engine cannot advertise their own reachability information. In various implementations, an SR-enabled network node determines that a next hop for the advertised prefix SID is a data plane engine associated with the prefix identified by the prefix SID, and then uses the forwarding address when forwarding data traffic to the data plane engine. Such determination can be made after verifying various routing/forwarding criteria. For example, SR-enabled node verifies that a source (here, control plane engine of SR node having dislocated control/data plane) of the SID advertisement (indicating a best path for the prefix) set the f-bit in the prefix SID sub-TLV. In another example, SR-enabled node verifies that a source (here, control plane engine) of the SID advertisement (indicating a best path for the prefix) is on a same connected network as a potential next hop address (here, data plane engine). In yet another example, the SR-enabled network node calculates a next hop address for the prefix SID and verifies that the forwarding address advertised by a source (here, control plane engine) of the route advertisement matches the calculated next hop address. In yet another example, the SR-enabled network node verifies that no neighboring network elements (such as an OSPF neighbor) have an address equal to the calculated next hop address. In various implementations, SR-enabled network node assumes that the next hop for the advertised prefix SID is the data plane engine when all above mentioned criteria are verified as true. SR nodes having collocated control/data planes can thus update reachability information for data plane element/engines of SR nodes having dislocated control/data planes, such that SR nodes having collocated control/data planes can directly forward data traffic to the data plane element/engines.

In some configurations, communications system 10 may include a SDN controller provided for learning a topology of SR network 12 (for example, via BGP Link State Distribution (BGP-LS) or other suitable means). SDN controller may provide paths through SR network 12 from a source host to a destination host in response to a service level agreement ("SLA") request from an SDN application. In such configurations, SR-enabled network nodes receiving route and SID advertisements from the control plane engine may redistribute (re-advertise) the prefix SID with its associated forwarding address via BGP-LS, for example, to SDN controller. Similarly, the control plane engine may redistribute (re-advertise) the prefix SID with its associated forwarding address via BGP-LS, for example, to SDN controller. IGP routing advertisements may be used for redistributing the prefix SID with its associated forwarding address. In some embodiments, the IGP advertisement may advertise the forwarding address in a prefix attribute. In network topologies that implement OSPF routing protocol in the control plane, external LSAs, such as a LSAs Type-5 or a LSAs Type-7, may be used to advertise the forwarding address in a prefix attribute.

Figure 2:
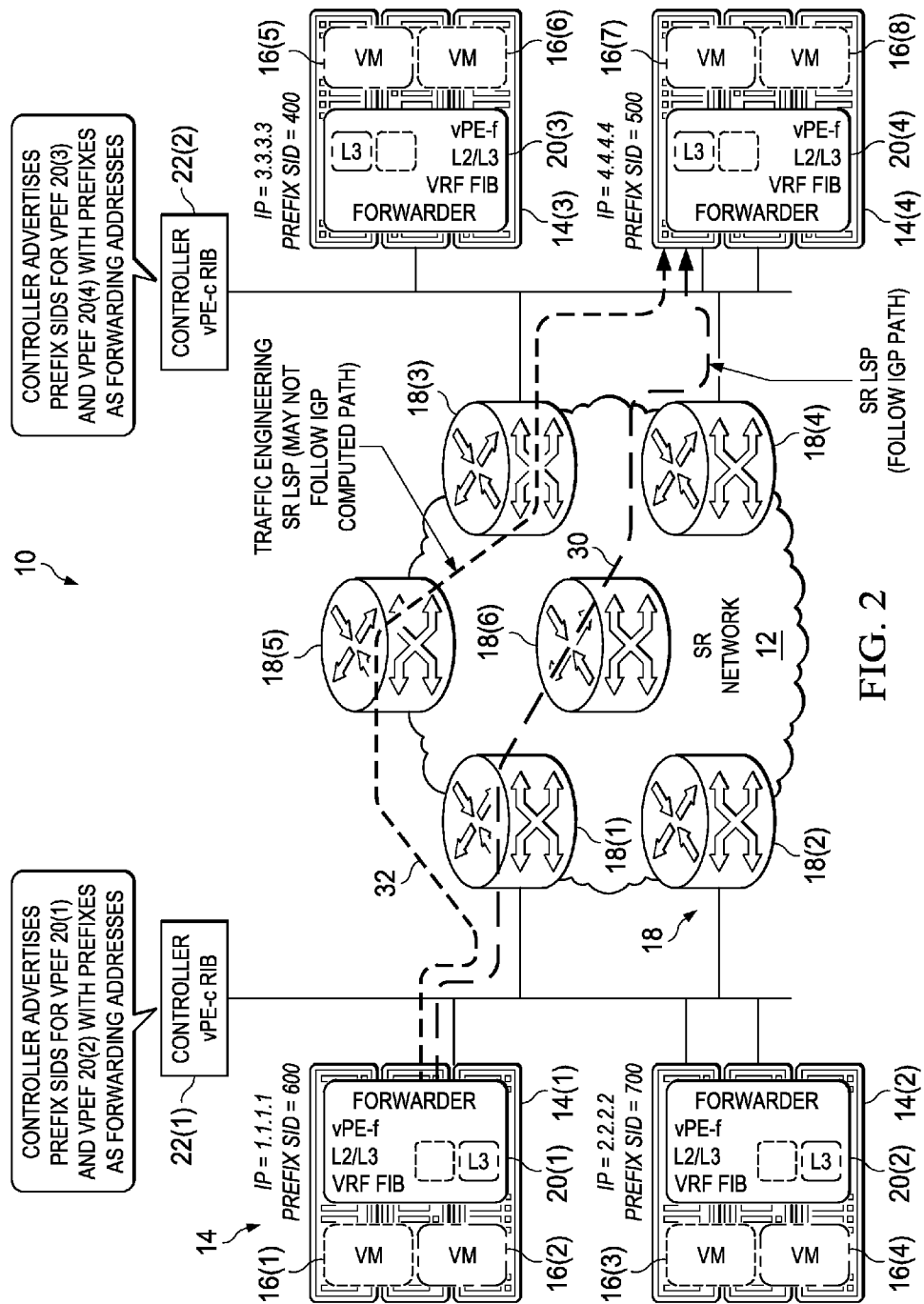
FIG. 2 is a simplified schematic block diagram illustrating an exemplary configuration of the communication system for distributing (advertising) segment identifiers in the network environment.

Turning to FIG. 2, FIG. 2 is a simplified block diagram illustrating an exemplary configuration of communication system 10 for distributing (advertising) SIDS in NFV and/or SDN environments. Controller 22(1) can advertise a prefix for vPE forwarder 20(1) and vPE forwarder 20(2) to SR routers 18, and controller 22(2) can advertise a prefix for vPE forwarder 20(3) and vPE forwarder 20(4) to SR routers 18. Each vPE forwarder may be assigned a unique prefix (such as a /32 IP address), referred to as a virtual vPEF address. For a given route advertisement, controller 22(1) and controller 22(2) also advertise a forwarding address with the prefix, where the forwarding address is equal to the prefix assigned to the vPE forwarder in the given route advertisement. In FIG. 2, vPE forwarder 20(1) may be assigned a virtual vPEF address of 1.1.1.1/32, vPE forwarder 20(2) may be assigned a virtual vPEF address of 2.2.2.2/32, vPE forwarder 20(3) may be assigned a virtual vPEF address of 3.3.3.3/32, and vPE forwarder 20(4) may be assigned a virtual vPEF address of 4.4.4.4/32. Since the forwarding addresses are equal to the prefixes, route advertisements for vPE forwarders 20(1)-20(4) respectively indicate forwarding addresses of 1.1.1.1/32 for vPE forwarder 20(1), 2.2.2.2/32 for vPE forwarder 20(2), 3.3.3.3/32 for vPE forwarder 20(3), and 4.4.4.4/32 for vPE forwarder 20(4). In some embodiments, vPE forwarder 20(1) and vPE forwarder 20(2) belong to a same network, such as a common local area network (LAN). vPE forwarder 20(3) and vPE forwarder 20(4) may also belong to a same network, such as a common LAN.

Controller 22(1) can also advertise prefix SIDs for prefixes associated with vPE forwarder 20(1) and vPE forwarder 20(2) to SR routers 18, and controller 22(2) can advertise prefix SIDs for prefixes associated with vPE forwarder 20(3) and vPE forwarder 20(4) to SR routers 18. In the present example, a virtual vPEF address identifying vPE forwarder 20(1) (here, 1.1.1.1/32) may be assigned a prefix SID of 600, a virtual vPEF address identifying vPE forwarder 20(2) (here, 2.2.2.2/32) may be assigned a prefix SID of 700, a vPEF address identifying vPE forwarder 20(3) (here, of 3.3.3.3/32) may be assigned a prefix SID of 400, and a virtual vPEF address identifying vPE forwarder 20(4) (here, of 4.4.4.4/32) may be assigned a prefix SID of 500. Controller 22(1), controller 22(2), and or a network administrator/operator can assign prefix SIDs to prefixes associated with vPE forwarders 20(1)-20(4). When controller 22(1) or controller 22(2) advertise a prefix SID for a prefix that has been assigned a forwarding address, controller 22(1) and controller 22(2) set a an f-bit provisioned in a flag field of a prefix SID sub-TLV to indicate that a forwarding address has been assigned to the prefix identified by the prefix SID.

Various network elements in SR network 12 receive the route advertisements and SID advertisements and update reachability information based on the route advertisements and the SID advertisements. In a specific example, to establish SR LSPs 30 and 32 to vPE forwarder 20(4), controller 22(2) can send a route advertisement and SID advertisement that provides reachability information for vPE forwarder 20(4) to SR node 18(3). The route advertisement can include a prefix and a forwarding address for vPE forwarder 20(4) (in the present example, 4.4.4.4/32). The SID advertisement can include a prefix SID (in the present example, 500) for the prefix assigned to vPE forwarder 20(4). Upon receiving the route advertisements and the SID advertisement, SR router 18(3) can update reachability information for vPE forwarder 20(4), such as updating its data plane to ensure that SR router 18(3) forwards data traffic to vPE forwarder using the forwarding address (in the present example, 4.4.4.4/32) instead of to controller 22(2), a source of the route advertisement and the SID advertisement. In various implementations, SR router 18(3) determines that a next hop for the prefix SID is vPE forwarder 20(4) associated with the prefix identified by the prefix SID, and then uses the forwarding address when forwarding data traffic to vPE forwarder 20(4). In an example, SR router 18(3) can verify that a source (controller 22(2)) of the SID advertisement (indicating a best path for the prefix) set the f-bit in the prefix SID sub-TLV. In another example, SR router 18(3) can verifies that a source (controller 22(2)) of the SID advertisement (indicating a best path for the prefix) is on a same connected network as a potential next hop address (here, data plane engine). In yet another example, SR router 18(3) can calculate a next hop address for the prefix SID and verifies that the forwarding address advertised by a source (controller 22(2)) of the route advertisement matches the calculated next hop address. In yet another example, SR router 18(3) can verify that no neighboring network elements (such as an OSPF neighbor) have an address equal to the calculated next hop address. In various implementations, SR router 18(3) assumes that the next hop for the advertised prefix SID is vPE forwarder 20(4) when all above mentioned criteria is verified as true.

In various implementations, when SR router 18(3) programs its routing and/or forwarding tables based on information (such as address prefix, network mask, and SR SID) received from controller 22(2), SR router 18(3) uses a segment routing global block (SRGB) advertised by controller 22(2) since vPE forwarder 20(4) cannot advertise their SRGBs. In various implementations, SR router 18(3) may program an associated routing information base (RIB) table with an entry for vPE forwarder 20(4) as follows:

Prefix: 4.4.4.4/32

Outgoing Interface: LAN interface where vPE-controller 22(2) and vPE-forwarders 20(3) and 20(4) are connected Next-hop: Address of vPE forwarder 20(4) on LAN Local label: 500 Outgoing Label: Depending on prefix SID for 4.4.4.4/32 advertised by vPE-controller 22(2)

Implicit Null—if No-PHP flag is not

500—if No-PHP flag is set and E-bit is not set

Explicit Null—if No-PHP flag is set and E-bit is set

SR router 18(3) may program an associate forwarding information base (FIB) table with an entry for vPE forwarder 20(4) that mirrors the RIB table.

Figure 3:
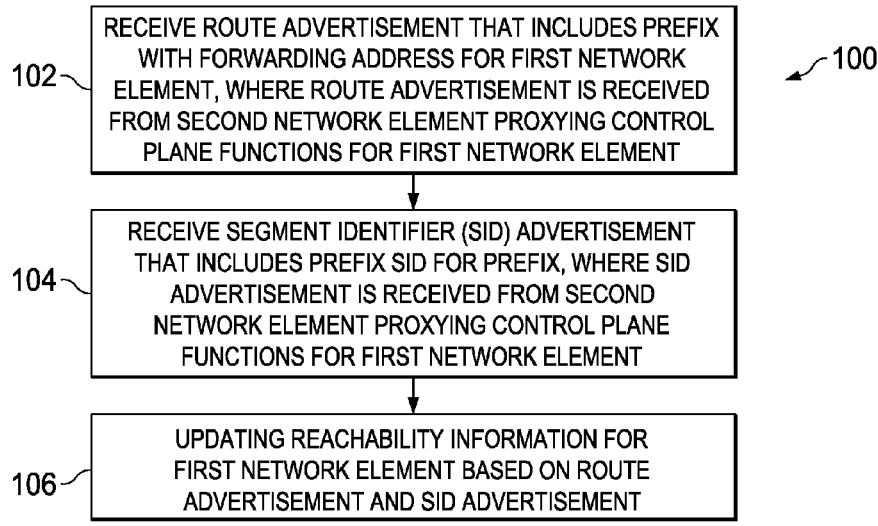
FIG. 3 is a simplified flow diagram illustrating example operations that can be associated with the communication system.

Turning to FIG. 3, FIG. 3 is a simplified flow diagram illustrating example operations 100 that may be associated with various embodiments of communication system 10. At block 102, a route advertisement that includes a prefix with a forwarding address for a first network element. The route advertisement is received from a second network element proxying control plane functions for the first network element. In various implementations, a SR node having a dislocated control/data plane, such as a virtual provider edge router, is realized by the first network element and the second network element. For example, the first network element is a vPE forwarder, such as vPE forwarders 20(1)-20(4) described above, and the second network element is a vPE control pane, such as controller 22(1) or controller 22(2), proxying control functions for the vPE forwarder. At block 104, a segment identifier (SID) advertisement that includes a prefix SID for the prefix. The SID advertisement is received from the second network element proxying control plane functions for the first network element. At block 106, reachability information is updated for the first network element based on the route advertisement and the SID advertisement. In various implementations, a SR node having a collocated control/data plane, such as SR routers 18, receives the route advertisement and SID advertisement, and updates its forwarding plane based on the route advertisement and the SID advertisement, such that the SR node can forward data traffic directly to the first network element, such as one of vPE forwarders 20(1)-20(4).

Figure 4:
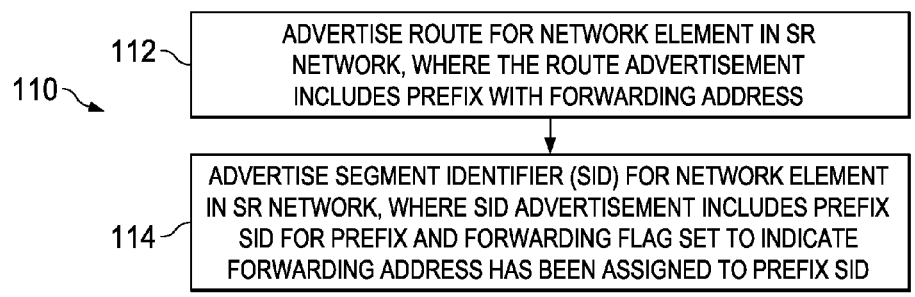
FIG. 4 is a simplified flow diagram illustrating example operations that can be associated with the communication system.

Turning to FIG. 4, FIG. 4 is a simplified flow diagram illustrating example operations 110 that may be associated with various embodiments of communication system 10. In various implementations, SR nodes having dislocated control/data planes can perform operations 110 to provide reachability to its data plane. For example, a vPE control pane, such as controller 22(1) or controller 22(2), proxying control functions for a vPE forwarder, such as one of vPE forwarders 20(1)-20(4), can perform operations 110 to provide reachability information to the vPE forwarder. At block 112, a route is advertised for a network element to SR nodes in a SR network. The route advertisement includes a prefix with a forwarding address for the network element. In various implementations, the network element is a vPE forwarder, such as vPE forwarders 20(1)-20(4) described above. At block 114, a segment identifier (SID) for the network element is advertised to SR nodes in the SR network. The SID advertisement includes a prefix SID for the prefix. The SID advertisement further includes a forwarding flag (f-flag) set, indicating that a forwarding address has been assigned to the prefix-SID. In various implementations, SR nodes in the SR network update reachability information for the network element based on the route advertisement and the SID advertisement. In various implementations, a SR node having a collocated control/data plane, such as SR routers 18 in SR network 12, updates its forwarding plane based on the route advertisement and the SID advertisement received from a control plane of an SR node having a dislocated control/data plane (such as vPE controller, such that the SR node can forward data traffic directly to the network element, such as one of vPE forwarders 20(1)-20(4).

Figure 5:
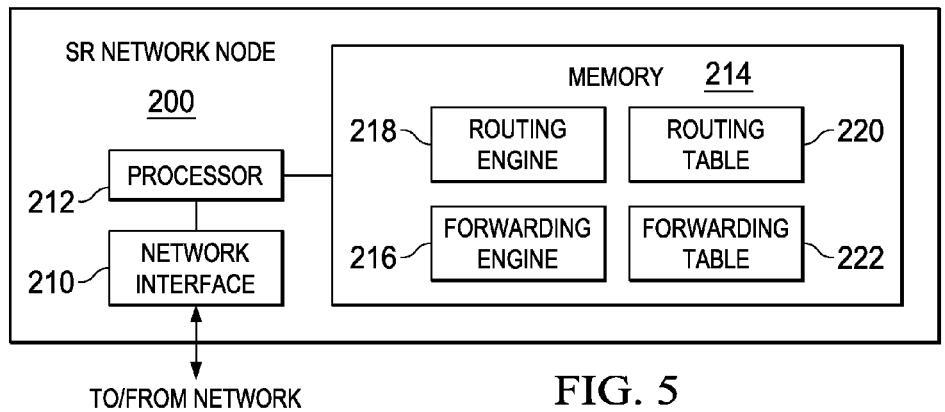
FIG. 5 is a simplified schematic block diagram illustrating an exemplary configuration of a segment routing network node in the communication system.

Turning to FIG. 5, FIG. 5 is a block diagram of an exemplary embodiment of a segment routing (SR) network node 200 that can perform various operations as described herein. SR network node 200 may be a SR node having a collocated control/data plane, such as SR routers 18, or a SR node having a dislocated control/data plane, such as SR virtual provider edge routers realized by one of vPE forwarders 20(1)-20(4) and one of controllers 22(1) or 22(2). SR network node 200 includes a control plane engine/element and a data plane engine/element that respectively provide routing and forwarding capabilities. SR network node 200 includes a network interface 210, a processor 212, and a memory 214 that may be interconnected by a system interconnect. Network interface 210 connects SR network node 200 to one or more networks, such as SR network 12. Network interface 210 contains mechanical, electrical and signaling circuitry for communicating data over links connected to a network, such as SR network 12. Network interface 210 may be configured to transmit and/or receive network traffic, including data traffic, using a variety of different communication protocols, such as those described herein, over physical links or wireless links. In some implementations, network interface 210 may be used to implement a virtual network interface, for example, to provide virtual private network (VPN) access.

Processor 212 can include any necessary elements or logic adapted to execute software programs and processes and manipulate data. Memory 214 can store software programs and data associated with operations described herein. An operating system (not shown), portions of which may be resident in memory 214 and executed by processor 212, can functionally organize SR network node 200, invoking network operations in support of software processes and/or services executing on SR network node 200.

SR network node 200 includes a forwarding engine 216 that performs data plane functions as described herein for SR network node 200 and a routing engine 218 that performs control plane functions as described herein for SR network node 200. Routing engine 218 can generate a routing table 220 and/or forwarding table 222 for SR network node 200. Routing table 220 stores routing information that defines routes through SR network 12. Routing table 220 can associate SIDs to a network topology associated with communication system 10 (such as a topology of SR network 12), and forwarding table 222 can associate segment IDs to respective interfaces for forwarding data traffic. In various embodiments, routing engine 218 includes computer executable instructions that when executed by processor 212 are operable to receive network information and generate a data structure, such as routing table 218 or forwarding table 220 to relate SIDS to the network topology. In some embodiments, forwarding table 222 can relate SIDs to respective stack instructions indicating whether a SID is to be removed or retained when forwarding a packet. In various embodiments, forwarding engine 216 includes computer executable instructions that when executed by processor 212 are operable to read a top SID in a label stack (such as a segment ID stack) attached to a packet or message, access a forwarding table (such as forwarding table 222) to obtain forwarding instructions for the top SID, and forward the packet or message according to the forwarding instructions.

In example implementations, at least some portions of the activities outlined herein may be implemented in software in, for example, hosts 14, virtual machines 16, SR routers 18, vPE forwarders 20(1)-20(4), controller 22(1), and/or controller 22(2). In some embodiments, one or more of these features may be implemented in hardware, provided external to these elements, or consolidated in any appropriate manner to achieve the intended functionality. Various network elements described herein (for example, hosts 14, virtual machines 16, SR routers 18, vPE forwarders 20(1)-20(4), controller 22(1), and/or controller 22(2)) may include software (or reciprocating software) that can coordinate in order to achieve the operations as outlined herein. In still other embodiments, these elements may include any suitable algorithms, hardware, software, components, modules, interfaces, or objects that facilitate the operations thereof. Furthermore, hosts 14, virtual machines 16, SR routers 18, vPE forwarders 20(1)-20(4), controller 22(1), and/or controller 22(2) described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations" and the like are intended to mean that any such features are included in one or more embodiments of the present disclosure, but may or may not necessarily be combined in the same embodiments.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving a route advertisement that includes a prefix with a forwarding address for a first network element, wherein the route advertisement is received from a second network element proxying control plane functions for the first network element;
    receiving a segment identifier (SID) advertisement that includes a prefix SID for the prefix, wherein the SID advertisement is received from the second network element proxying control plane functions for the first network element;
    determining whether the second network element is on a same network as the first network element; and
    updating reachability information for the first network element based on the route advertisement, the SID advertisement, and whether the second network element is on the same network as the first network element.

2. The method of claim 1, wherein the updating includes designating the forwarding address as a next hop for the prefix SID.

3. The method of claim 1, wherein the SID advertisement includes a forwarding flag that indicates whether the prefix has been assigned a forwarding address, the method further comprising designating the forwarding address as the next hop for the prefix SID when the forwarding flag is set.

4. The method of claim 1, further comprising:
    calculating a next hop for the prefix SID.

5. The method of claim 4, further comprising:
    determining that no neighboring network element has an address equal to the calculated next hop.

6. The method of claim 5, further comprising:
    determining that the forwarding address matches the calculated next hop.

7. The method of claim 1, wherein the route advertisement and the SID advertisement are (Interior Gateway Protocol) IGP advertisements.

8. The method of claim 1, wherein the forwarding address is equal to the prefix.

9. A non-transitory media encoded with logic that includes code for execution, and when executed by a processor, is operable to perform operations comprising:

receiving a route advertisement that includes a prefix with a forwarding address for a first network element, wherein the route advertisement is received from a second network element proxying control plane functions for the first network element;

receiving a segment identifier (SID) advertisement that includes a prefix SID for the prefix, wherein the SID advertisement is received from the second network element proxying control plane functions for the first network element;

determining whether the second network element is on a same network as the first network element; and updating reachability information for the first network element based on the route advertisement, the SID advertisement, and whether the second network element is on the same network as the first network element.

10. The non-transitory media of claim 9, wherein the updating includes designating the forwarding address as a next hop for the prefix SID.

11. The non-transitory media of claim 9, wherein the SID advertisement includes a forwarding flag that indicates whether the prefix has been assigned a forwarding address, and further wherein the operations further comprise designating the forwarding address as the next hop for the prefix SID when the forwarding flag is set.

12. The non-transitory media of claim 9, wherein the operations further comprise:
calculating a next hop for the prefix SID; and
determining that no neighboring network element has an address equal to the calculated next hop.

13. The non-transitory media of claim 9, wherein the operations further comprise:
calculating a next hop for the prefix SID; and
determining that the forwarding address matches the calculated next hop.

14. The non-transitory media of claim 9, wherein the forwarding address is equal to the prefix.

15. An apparatus comprising:
a memory element for storing data; and
a processor operable to execute instructions associated with the data, wherein the processor and the memory element cooperate such that the apparatus is configured for:

receive a route advertisement that includes a prefix with a forwarding address for a first network element, wherein the route advertisement is received from a second network element proxying control plane functions for the first network element;

receive a segment identifier (SID) advertisement that includes a prefix SID for the prefix, wherein the SID advertisement is received from the second network element proxying control plane functions for the first network element;

determine whether the second network element is on a same network as the first network element; and update reachability information for the first network element based on the route advertisement, the SID advertisement, and whether the second network element is on the same network as the first network element.

16. The apparatus of claim 15, wherein the updating includes designating the forwarding address as a next hop for the prefix SID.

17. The apparatus of claim 15, wherein the SID advertisement includes a forwarding flag that indicates whether the prefix has been assigned a forwarding address, the apparatus further configured to designate the forwarding address as the next hop for the prefix SID when the forwarding flag is set.

18. The apparatus of claim 15, further configured for:
calculating a next hop for the prefix SID; and
determining that no neighboring network element has an address equal to the calculated next hop.

19. The apparatus of claim 15, further configured for:
calculating a next hop for the prefix SID; and
determining that the forwarding address matches the calculated next hop.

20. The apparatus of claim 15, wherein the forwarding address is equal to the prefix.

* * * * *